(12) United States Patent
Shin et al.

(10) Patent No.: US 12,436,420 B2
(45) Date of Patent: Oct. 7, 2025

(54) DISPLAY DEVICE

(71) Applicant: LG Display Co., Ltd., Seoul (KR)

(72) Inventors: Chulho Shin, Gunpo-si (KR); Chinll Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/491,414

(22) Filed: Oct. 20, 2023

(65) Prior Publication Data

US 2024/0160056 A1     May 16, 2024

(30) Foreign Application Priority Data

Nov. 11, 2022 (KR) .......... 10-2022-0150534
Sep. 27, 2023 (KR) .......... 10-2023-0130877

(51) Int. Cl.
*G02F 1/1333* (2006.01)
*F21V 8/00* (2006.01)
*G02F 1/13357* (2006.01)

(52) U.S. Cl.
CPC ..... *G02F 1/133314* (2021.01); *G02B 6/0073* (2013.01); *G02B 6/0083* (2013.01); *G02B 6/0088* (2013.01); *G02F 1/133317* (2021.01); *G02F 1/133603* (2013.01); *G02F 1/133608* (2013.01)

(58) Field of Classification Search
CPC ......... G02F 1/133314; G02F 1/133317; G02F 1/133603; G02F 1/133608; G02B 6/0073; G02B 6/0083; G02B 6/0088
See application file for complete search history.

(56) References Cited

U.S. PATENT DOCUMENTS

| | | | |
|---|---|---|---|
| 9,753,314 B2 | 9/2017 | Kim et al. | |
| 2010/0302478 A1* | 12/2010 | Nakagawa | G02B 6/0091 349/62 |
| 2011/0058120 A1* | 3/2011 | Oohira | G02F 1/133608 361/749 |
| 2014/0146513 A1 | 5/2014 | Choi et al. | |
| 2015/0286087 A1 | 10/2015 | Kim et al. | |
| 2017/0139259 A1* | 5/2017 | Kim | G02F 1/133308 |

FOREIGN PATENT DOCUMENTS

| | | |
|---|---|---|
| KR | 10-2012-0017720 A | 2/2012 |
| KR | 10-2014-0067626 A | 6/2014 |
| KR | 10-2015-0115041 A | 10/2015 |
| KR | 10-2016-0002569 A | 1/2016 |
| KR | 10-2017-0009586 A | 1/2017 |
| KR | 10-2017-0063152 A | 6/2017 |

OTHER PUBLICATIONS

Oh et al., KR 102012017720, Feb. 2012 (Year: 2012).*
Kim, KR 1020130000577, Jan. 2013 (Year: 2013).*

* cited by examiner

*Primary Examiner* — Mary Ellen Bowman
(74) *Attorney, Agent, or Firm* — Fenwick & West LLP

(57) ABSTRACT

According to an exemplary of the present disclosure, a display device includes a display panel which displays images and a bottom cover which encloses a rear surface and a side surface of the display panel, and a lower end of the bottom cover extends from a lower end of the display panel to dispose a source printed circuit board in an inner space. By doing this, the entire thickness is reduced to implement a slim design.

29 Claims, 16 Drawing Sheets

DISPLAY DEVICE

CROSS-REFERENCE TO RELATED APPLICATIONS

This application claims the priority of Republic of Korea Patent Application No. 10-2022-0150534 filed on Nov. 11, 2022 and Republic of Korea Patent Application No. 10-2023-0130877 filed on Sep. 27, 2023, in the Korean Intellectual Property Office, each of which are incorporated by reference in their entirety.

BACKGROUND

Technical Field

The present disclosure relates to a display device, and more particularly, to a display device having a stand fixing structure.

Description of the Related Art

Currently, as it enters a full-scale information era, a field of a display device which visually expresses electrical information signals has been rapidly developed and studies are continuing to improve performances of various display devices such as a thin-thickness, a light weight, and low power consumption.

As a representative display device, there are a liquid crystal display (LCD) device, an electro-wetting display (EWD) device an organic light emitting display (OLED) device, and the like.

The liquid crystal display device includes a liquid crystal display panel in which an upper substrate and a lower substrate are bonded with a liquid crystal layer interposed therebetween, a driving circuit which applies a predetermined driving signal to a liquid crystal display panel, and an assembly component which assembles the liquid crystal display panel and the driving circuit and may further include various components according to an application field, such as a computer monitor or a television.

SUMMARY

An object to be achieved by the present disclosure is to provide a display device which has an overall slim thickness and an elegant exterior design.

Objects of the present disclosure are not limited to the above-mentioned objects, and other objects, which are not mentioned above, can be clearly understood by those skilled in the art from the following descriptions.

In order to achieve the above-described objects, according to an embodiment of the present disclosure, a display device includes a display panel configured to display images. The display panel includes a rear surface extending in a first direction, and a side surface extending in a second direction different from the first direction. The display device also includes a bottom cover enclosing the rear surface and the side surface of the display panel along the first direction such that an inner space is formed in the display device, and a source printed circuit board in the inner space, the source printed circuit board non-overlapping with the display panel.

According to another embodiment of the present disclosure, a display device includes a display panel having a first side configured to display images and a second side opposite to the first side, and a back cover having a first portion that extends in a first direction and is overlapping with the display panel. The first portion has a first end and a second end. The second end of the first portion extends past an end of the second side of the display. The display device also includes a front cover having a front portion extending from the end of the display panel in the first direction such that a cavity is formed between the first portion of the back cover and a portion of the front cover that extends past the end of the display panel. The display device also includes a main board on the first portion of the back cover in the cavity. The main board overlaps the front cover, but is non-overlapping the display panel.

According to the present disclosure, a bending structure of a bottom cover is applied to a side surface of a display panel and one side of the bottom cover extends to dispose a source printed circuit board and a main board inside or dispose a source printed circuit board inside the bottom cover and cover the main board with a rear cover to reduce an entire thickness, thereby implementing a slim design.

According to the present disclosure, a rear cover is removed and only a minimum structure for hinge fixing remains on a rear surface of the display unit to implement a clean and differentiated design with a flat rear surface. As described above, according to the present disclosure, the rear cover is removed to implement a unibody and reduce cost.

Further, according to the present disclosure, even though the rear cover is applied, the protrusion to the rear surface may be minimized (or at least reduced) to minimize (or reduce) a thickness of the display device. As described above, the present disclosure can be utilized as a portable monitor due to its slim and simple design.

Further, according to the present disclosure, when a handle is applied to the rear surface of the display device, the display device can be hung on a wall to be utilized as a wall-mountable display or a frame display.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
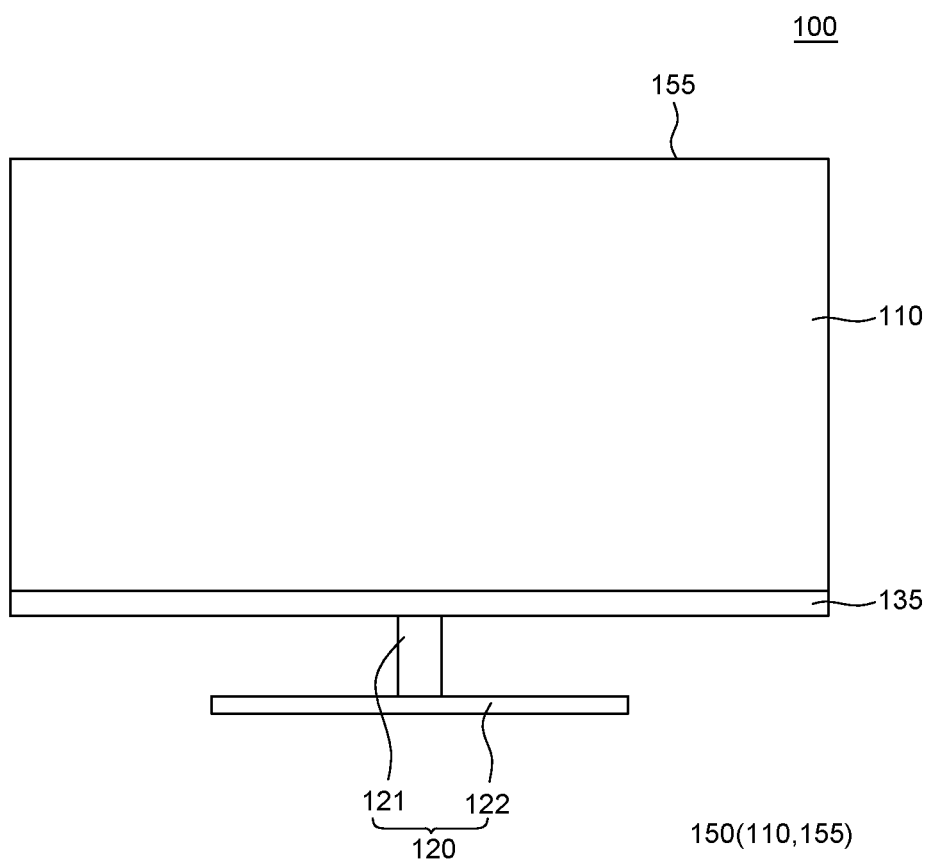
FIG. 1 is a front view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a front view of a display device according to an exemplary embodiment of the present disclosure.

FIG. 1 illustrates a display device with a stand fixing structure as an example, but the present disclosure is not limited thereto.

Referring to FIG. 1, a display device 100 according to an exemplary embodiment of the present disclosure includes a display panel 110 which displays an image and a stand unit 120 which is installed on a lower end of the display panel 110 to support a load of the display panel 110 and configures one set.

The display device 100 having a stand fixing structure is used as a stand structure to be equipped on a bottom surface of a predetermined space, such as a computer monitor or a television.

Even though it is not specifically illustrated, the display device 100 according to the exemplary embodiment of the present disclosure may further include a cover unit which encloses an outside of the display panel 110 and the cover unit may be divided into a front part and a rear part. For the convenience of description, both the display panel 110 and the cover unit are included to be referred to as a display unit 150.

Here, the cover unit may include a front cover 135 which covers a part of a lower end of the display panel 110 and a bottom cover 155 (also referred to as a back cover) which encloses a rear surface and a side surface of the display panel 110. The rear surface extends in a first direction (e.g., a vertical direction), and the side surface extends in a second direction (e.g., a horizontal direction) different from the first direction. A lower end of the bottom cover 155 extends from a lower end of the rear surface of the display panel along the first direction such that an inner space is formed in the display device. A main board is in the inner space. The main board is non-overlapping with the display panel. Even though it is omitted in FIG. 1, the cover unit may further include a top case which encloses a front edge of the display panel 110 to be coupled to a side surface of the bottom cover 155. In the present disclosure, in order to implement a narrow bezel, a top case is omitted.

The display panel 110 is a panel for displaying images to the user.

In the display panel 110, a display element which displays images, a driving element which drives the display element, wiring lines which transmit various signals to the display element, and the like and the driving element may be disposed. The display element may be defined in various manners depending on the type of the display panel 110 and for example, when the display panel 110 is a liquid crystal display panel, the display panel 110 may be configured to include upper and lower substrates and a liquid crystal layer interposed between the upper and lower substrates.

Hereinafter, it is assumed that the display panel 110 is a liquid crystal display panel, but the present disclosure is not limited thereto. When the display panel 110 is an organic light emitting display panel, the display element may be an organic light emitting diode which includes an anode, an organic light emitting layer, and a cathode.

The display panel 110 may be configured by upper and lower substrates and a liquid crystal layer interposed between the upper and lower substrates. The liquid crystal display device is a flat panel display device which displays an image by adjusting a transmittance of light in accordance with arrangement of liquid crystal molecules of the liquid crystal layer when light transmits.

On a rear side of the display panel 110, a backlight unit which supplies light and a bottom cover 155 which accommodates the backlight unit and the display panel 110 are disposed. At this time, the backlight unit may include a light source and an optical unit which supplies light generated from the light source to the display panel 110. The display panel 110 will be described below in more detail with reference to FIGS. 2 to 5.

The bottom cover 155 may enclose a rear surface and a side surface of the display panel 110 and accommodate the backlight unit and the display panel 110 which are laminated from a lowermost layer.

In some embodiments, the display device 100 further includes a stand unit 120 (also referred to as a stand) attached to the lower end of the bottom cover. In the meantime, the stand unit 120 may support the display unit 150 to stand upright on a flat table.

To this end, the stand unit 120 may be configured by a fixing plate (not illustrated), a tilt adjusting unit (not illustrated), a support unit 121, and a base plate 122. The fixing plate is coupled to a rear surface of the bottom cover 155, the tilt adjusting unit is integrally formed with the fixing plate to adjust a vertical angle (tilt) of the display unit 150, and the support unit 121 is coupled to the tilt adjusting unit to support the display unit 150. Further, the base plate 122 is provided on a bottom surface of the support unit 121 to support a load of the display unit 150.

The fixing plate may have a plurality of through holes to be fastened on the rear surface of the bottom cover 155, but is not limited thereto.

Even though it is not illustrated, when the rear surface of the bottom cover 155 and the stand unit 120 are assembled, a plurality of fastening protrusions may be formed on a lower end of the fixing plate of the stand unit 120 to suppress the stand unit 120 from moving on the rear surface of the bottom cover 155. Further, a fastening protrusion groove which is correspondingly coupled to the fastening protrusion of the fixing plate may be formed in a predetermined position of the bottom cover 155 to which the stand unit 120 is fixed by a screw, but the present disclosure is not limited thereto.

In the meantime, in the exemplary embodiment of the present disclosure, a bending structure of the bottom cover 155 is applied to the side surface of the display panel 110 and the rear cover is deleted, but one side of the bottom cover 155 extends to dispose the source printed circuit board and the main board therein. That is, three side portions of left, right and top ends of the bottom cover 155 are inwardly bent in the display panel 110 by approximately 180 degrees to form an in-curling structure (or hemming structure), and are bent by approximately 90 degrees in the opposite direction to form an 'L'-shaped bending structure. Further, a lower end of the bottom cover 155 extends and a side portion is bent inwardly in the display panel 110 by approximately 180 degrees to form an in-curling structure to dispose the source printed circuit board and the main board in the extended bottom cover 155. By doing this, the entire thickness is reduced to implement a slim design.

Specifically, according to the present disclosure, a rear cover is deleted and only a minimum structure for hinge fixing remains on a rear surface of the display unit 150 to implement a clean and differentiated design.

That is, in the related art, all the circuit components such as a main board and the hinge structure are disposed on the rear surface of the display unit so that the thickness is thick, which will be described with reference to FIG. 2.

Figure 2:
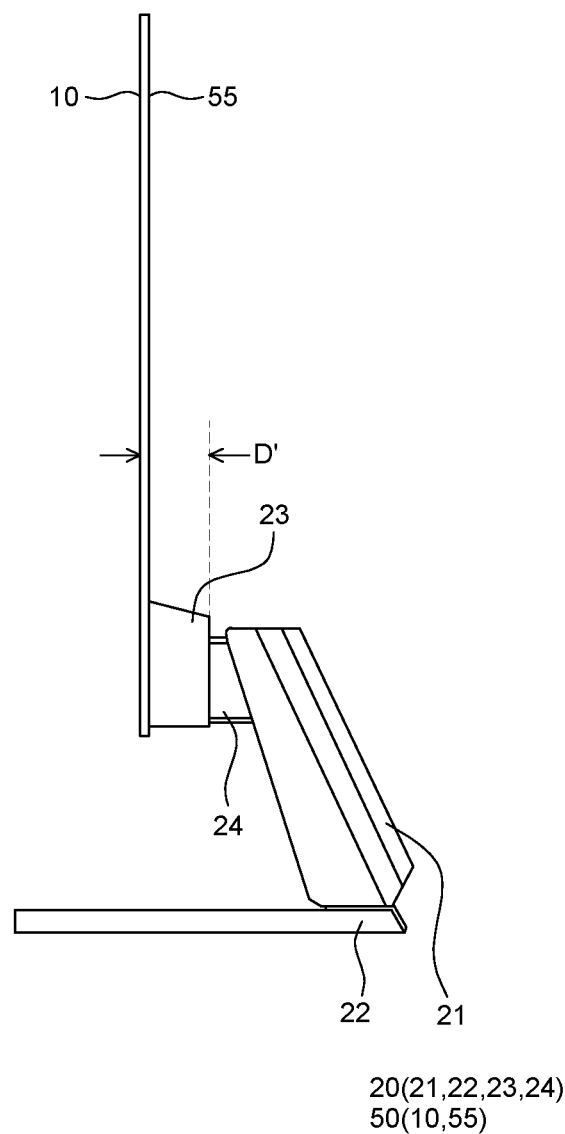
FIG. 2 is a side view of a display device according to a comparative embodiment of related art.

FIG. 2 is a side view of a display device according to a comparative embodiment.

Referring to FIG. 2, a display device according to the comparative embodiment includes a display panel 10 which displays an image and a stand unit 20 which is installed below the display panel 10 to support a load of the display panel 10.

The stand unit 20 is configured by a fixing plate 23 which is coupled to a rear surface of the bottom cover 55, a tilt adjusting unit 24 which is integrally formed with the fixing plate 23 to adjust a vertical angle of the display unit 50, a support unit 21 which is coupled to the tilt adjusting unit 24 to support the display unit 50, and a base plate 22 which is provided on a bottom surface of the support unit 21.

At this time, in the display device according to the comparative embodiment, all circuit components, such as a main board, a source printed circuit board, and a cable connector and a hinge structure are disposed on the rear surface of the display unit 50 so that the thickness D' is thick. Further, a lower end of the display unit 50 convexly protrudes toward the rear surface so that it is restricted to implementing a slim design.

Further, as the thickness D' of the entire set is thick so that a size and a design of the stand unit 20 are restricted.

Further, the number of assembly components, such as screws or pemnuts, for coupling the bottom cover 55 and the circuit component and the stand unit 20 is increased, so that costs for molding and processing the bottom cover 55 are increased. Further, a guide panel is used for the assembling so that the process is complex and the costs for molding and processing are increased.

Therefore, in the present disclosure, a bending structure of the bottom cover 155 is applied to the side surface of the display panel 110 and a side surface of the bottom cover 155 extends to dispose the source printed circuit board and the main board in the bottom cover 155. By doing this, the entire thickness is reduced to implement the slim design, which will be described in detail with reference to FIGS. 3 to 8.

Figure 3:
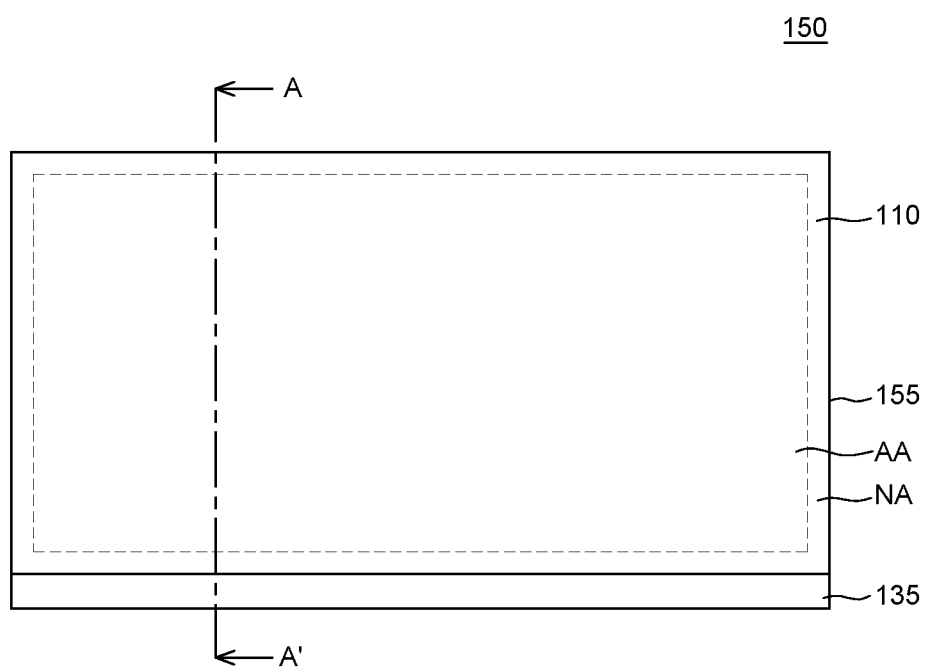
FIG. 3 is a front view of a display unit according to an exemplary embodiment of the present disclosure.

FIG. 3 is a front view of a display unit according to an exemplary embodiment of the present disclosure.

Figure 4:
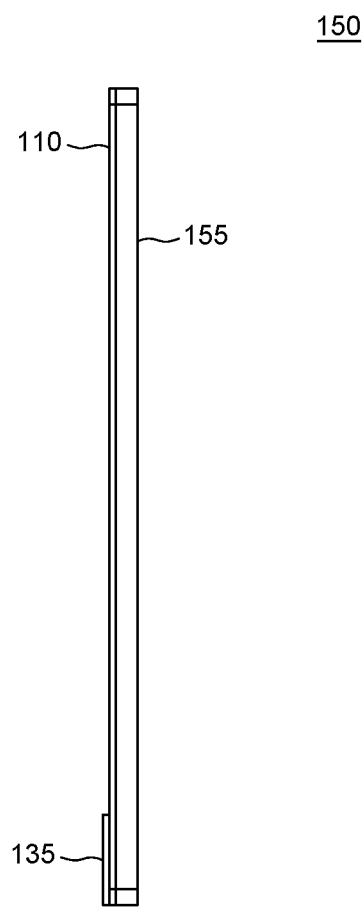
FIG. 4 is a side view of a display unit according to an exemplary embodiment of the present disclosure.
Figure 5:
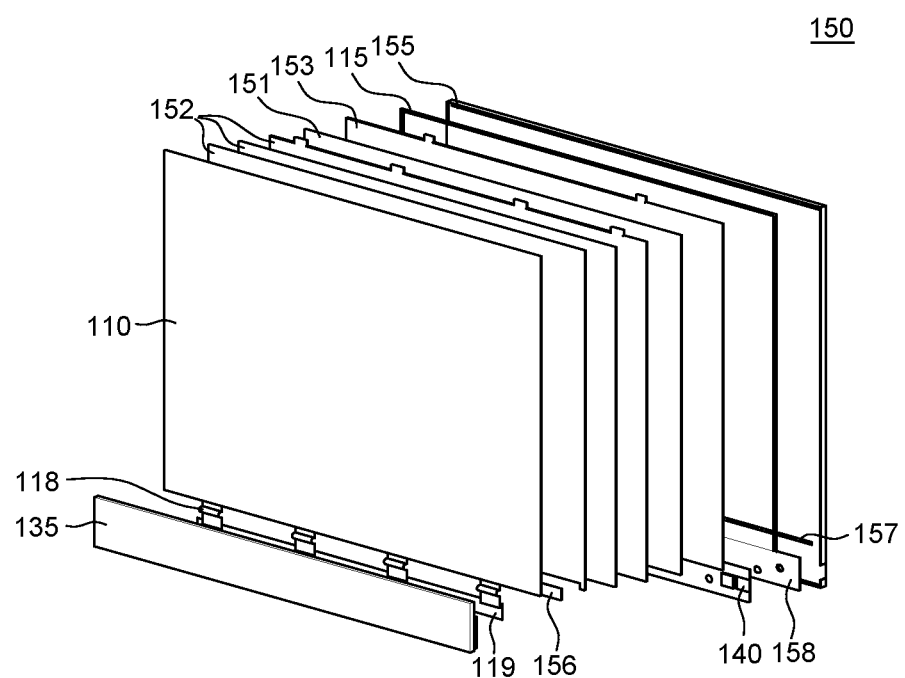
FIG. 5 is an exploded perspective view of a display unit according to an exemplary embodiment of the present disclosure.
Figure 6:
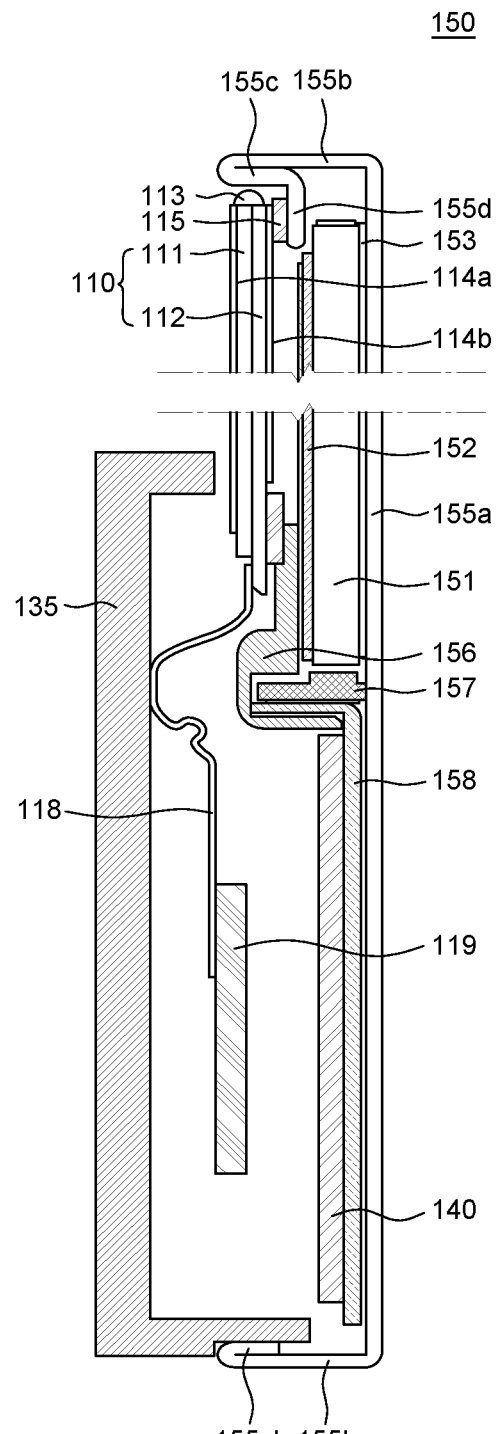
FIG. 6 is a cross-sectional view taken along the line A-A' of FIG. 3 according to an exemplary embodiment of the present disclosure.

FIG. 4 is a side view of a display unit according to an exemplary embodiment of the present disclosure;

FIG. 5 is an exploded perspective view of a display unit according to an exemplary embodiment of the present disclosure;

FIG. 6 is a cross-sectional view taken along the line A-A' of FIG. 3.

Figure 7:
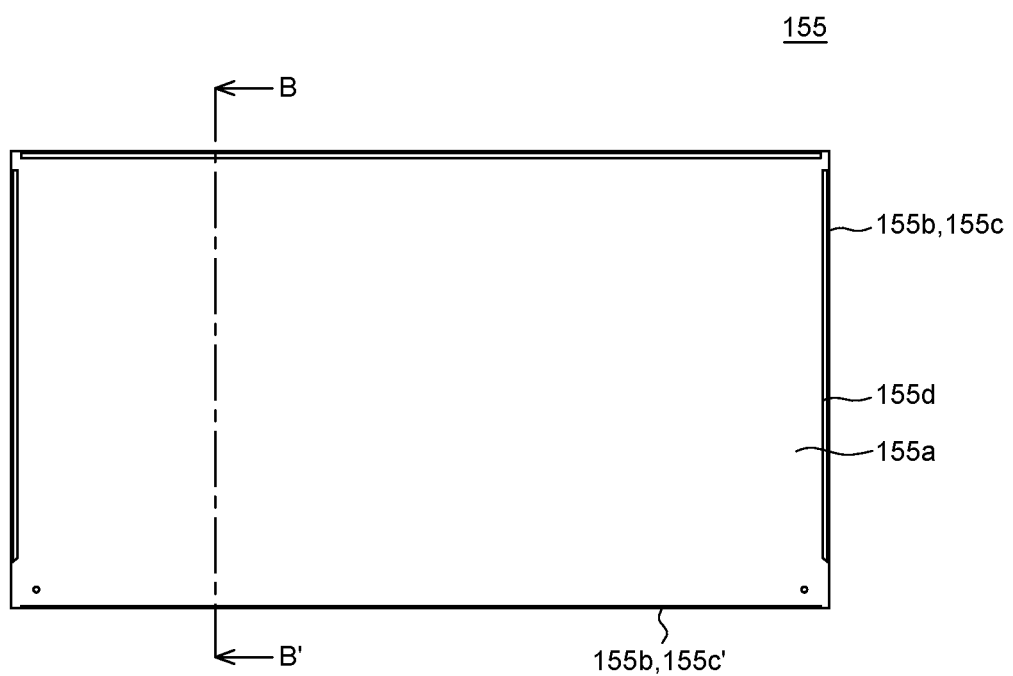
FIG. 7 is a front view of the bottom cover according to an exemplary embodiment of the present disclosure.
Figure 8:
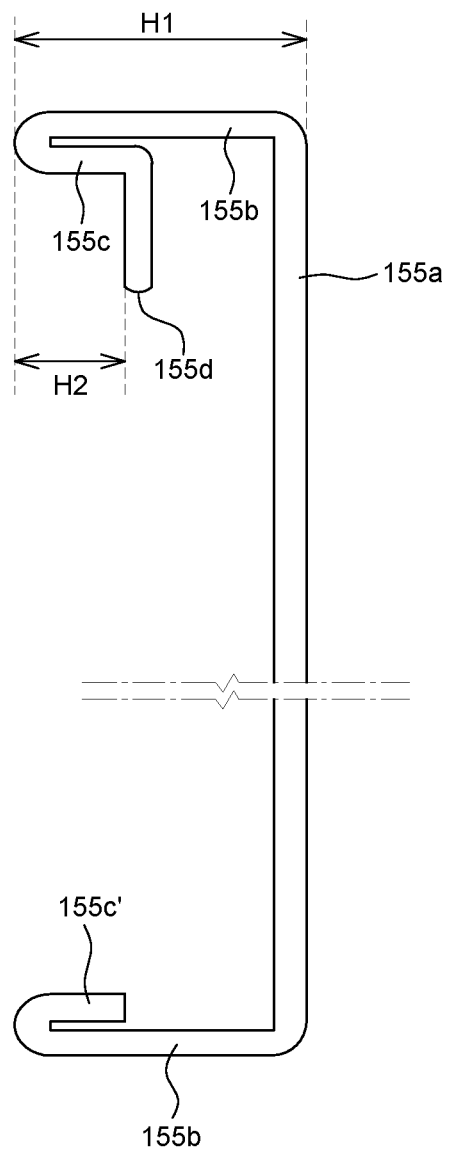
FIG. 8 is a cross-sectional view taken along the line B-B' of FIG. 7 according to an exemplary embodiment of the present disclosure.

FIG. 7 is a front view of the bottom cover according to an exemplary embodiment of the present disclosure; and FIG. 8 is a cross-sectional view taken along the line B-B' of FIG. 7.

FIG. 4 illustrates a side view of the display unit 150 of FIG. 3 seen from a right side. As compared with the comparative embodiment, it is understood that the rear cover is deleted and circuit components, such as the source printed circuit board 119 and the main board 140 are disposed in the bottom cover 155 so that the thickness is greatly reduced.

Referring to FIGS. 3 to 8, the display unit 150 of the exemplary embodiment of the present disclosure may include a display panel 110 which displays an image, a bottom cover 155 which encloses a rear surface and a side surface of the display panel 110, and various circuit components disposed in the bottom cover 155.

First, the display panel 110 may be configured by upper and lower substrates 111 and 112 and a liquid crystal layer (not illustrated) interposed between the upper and lower substrates 111 and 112.

Hereinafter, it is assumed that the display panel 110 is a liquid crystal display panel, but as described above, the present disclosure is not limited thereto. When the display panel 110 is an organic light emitting display panel, the display element may be an organic light emitting diode which includes an anode, an organic light emitting layer, and a cathode.

Hereinafter, even though it is not illustrated in the drawing, under the assumption of an active matrix type, a plurality gate lines and data lines intersect to define sub pixels on an inner surface of the lower substrate 112 which is generally referred to as an array substrate or a first substrate. Further, the thin film transistor is provided in every intersection to be connected to a pixel electrode formed in each sub pixel.

Further, red (R), green (G), and blue (B) color filters corresponding to the sub pixels, a black matrix which encloses the color filters, and blocks non-display elements such as the gate lines, the data lines, and the thin film transistor, and a common electrode which covers them are provided on an inner surface of the upper substrate 111. The upper substrate is referred to as a color filter substrate or a second substrate. At this time, when the liquid crystal display panel is an in-plane switching (IPS) mode or a fringe field switching (FFS) mode, the common electrode may be formed on the lower substrate 112.

Upper and lower polarizers 114a and 114b which selectively transmit only specific light may be attached onto an outer surface of the upper and lower substrates 111 and 112, respectively.

A sealing unit 113, such as sealant, may be provided on edge side surfaces of the upper and lower substrates 111 and 112 excluding the lower side to seal the side surfaces of the upper and lower substrates 111 and 112. The sealing unit 113 also serves to fix the upper and lower substrates 111 and 112 so that a top case of the related art may be omitted and thus a bezel width may be reduced.

In the meantime, the display panel 110 may include an active area AA and a non-active area NA.

The active area AA is an area in which images are displayed in the display panel 110.

In the active area AA, a plurality of sub pixels which configures the plurality of pixels and a circuit for driving the plurality of sub pixels may be disposed. The plurality of sub pixels is minimum units which configure the active area AA and a display element may be disposed in each of the plurality of sub pixels. The plurality of sub pixels may configure a pixel. For example, in each of the plurality of sub pixels, a thin film transistor which is a switching element may be disposed, but is not limited thereto. Further, a circuit for driving the plurality of sub pixels may include a driving element, a wiring line, and the like. For example, the circuit may be configured by a thin film transistor, a storage capacitor, a gate line, a data line, and the like, but is not limited thereto.

The non-active area NA is an area where no image is displayed.

Even though in FIG. 3, it is illustrated that the non-active area NA encloses a quadrangular active area AA, shapes and placements of the active area AA and the non-active area NA are not limited to the example illustrated in FIG. 3.

In other words, the active area AA and the non-active area NA may have shapes suitable for a design of an electronic device mounted with the display device. For example, another exemplary shape of the active area AA may be a pentagon, a hexagon, a circle, an oval, or the like.

In the non-active area NA, various wiring lines and circuits for driving the liquid crystal display element of the active area AA may be disposed. For example, in the non-active area NA, a wiring line which transmits signals to the plurality of sub pixels and circuits of the active area AA or a driving IC such as a gate driver IC or a data driver IC may be disposed, but it is not limited thereto.

Further, the display panel 110 may further include various additional elements to generate various signals or drive the pixel in the display area AA. The additional elements for driving the pixels may include an inverter circuit, a multiplexer, an electrostatic discharge circuit (ESD), or the like. The display panel 110 may further include an additional element associated with a function other than a function of driving the pixel. For example, the display panel 110 may include additional elements which provide a touch sensing function, a user authentication function (for example, finger print recognition), a multilevel pressure sensing function, a tactile feedback function, or the like. The additional elements may be located in an external circuit which is connected to the non-active area NA and/or the connecting interface.

The display unit 150 may further include a flexible film 118 and a source printed circuit board 119.

The flexible film 118 is a film in which various components are disposed on a base film having a ductility. Specifically, the flexible film 118 is a film which supplies a signal to the plurality of sub pixels and the circuits of the display area AA and may be electrically connected to the display panel 110. The flexible film 118 is disposed on one end of the non-display area NA of the display panel 110 to supply a power voltage or a data voltage to the plurality of sub pixels and the circuits of the display area AA. In the meantime, the number of flexible films 118 may vary depending on the design, and is not limited thereto.

For example, a driving IC such as a data driver IC may be disposed on the flexible film 118. The driving IC is a component which processes a data signal for displaying images, a driving signal for processing the data signal, and the like. The driving IC may be disposed by a chip on glass (COG), a chip on film (COF), a tape carrier package (TCP), or the like depending on a mounting method.

Further, the source printed circuit board 119 is disposed on one end of the flexible film 118 to be connected to the flexible film 118. The source printed circuit board 119 is a component which supplies signals to the driving IC. The source printed circuit board 119 may supply various signals such as a driving signal or a data signal to the driving IC. For example, a data driver which generates data signals may be mounted in the source printed circuit board 119 and the generated data signal may be supplied to the plurality of sub pixels and the circuit of the display panel 110 through the flexible film 118. The number of source printed circuit boards 119 may vary depending on the design, and is not limited thereto.

In the exemplary embodiment of the present disclosure, the source printed circuit board 119 is disposed on a lower end of the display panel 110 in a direction substantially parallel to the display panel 110. That is, the source printed circuit board 119 may be disposed on the lower end of the display panel 110 to be flat in a direction substantially parallel to the display panel 110.

In some embodiments, the display device 100 further includes a backlight (also referred to as a backlight unit) on the rear surface of the display panel 110. The backlight is configured to supply light to the display panel. In the meantime, on a rear surface of the display panel 110 configured as described above, a backlight unit which supplies light and a bottom cover 155 which accommodates the backlight unit and the display panel 110 may be disposed. The bottom cover 155 encloses the rear surface and the side surface of the display panel 110 and the display panel, and the backlight are on the bottom cover 155.

The backlight unit may correspond to one or more of a reflective plate 153, a light guide plate 151, and/or a plurality of optical sheets 152 shown in FIG. 6 and/or other components not shown in FIG. 6. The backlight unit may include an LED array assembly including a light source which is accommodated in the bottom cover 155, the light guide plate 151 which supplies a surface light source to the display panel 110 through the light source, the reflective plate 153 which is disposed on a rear surface of the light guide plate 151, and the plurality of optical sheets 152. The plurality of optical sheets 152 is disposed on a top surface of the light guide plate 151. However, the backlight unit is not limited thereto.

For example, the light source may be configured as an LED package in which LEDs are mounted and may be disposed in a light incident area of the light guide plate 151. The LED array assembly 157 may include an LED package and an LED printed circuit board.

An LED fixing plate 158 which mounts the LED package may be disposed on a rear surface of the LED array assembly 157.

The LED fixing plate 158 may extend to the outside. That is, the LED fixing plate 158 may extend to a lower direction of the bottom cover 155 in a direction substantially parallel to a lower portion 155a of the bottom cover 155. The lower portion 155a extends in the first direction. The lower portion 155a includes the lower end of the bottom cover 155. At this time, the LED fixing plate 158 which extends to a lower direction of the bottom cover 155 may be disposed in the bottom cover 155.

Some configurations of the backlight may be fixed by the guide panel 156 and the guide panel 156 may be fixed by the LED fixing plate 158. That is, the guide panel 156 is disposed below the display panel 110 and one end thereof extends between the display panel 110 and the optical sheet 152 to fix a lower end of the optical sheet 152 and the other end is downwardly bent while forming an accommodation space therein. Therefore, the LED array assembly 157 and the LED fixing plate 158 may be interposed in the accommodation space. The guide panel 156 may be fixed to the LED fixing plate 158 through a fixing means, such as a hook. That is, the guide panel 156 may be fixed to the LED fixing plate 158 by disposing a fixing means, such as a hook or a fixing means, such as a hook is disposed in the LED fixing plate 158 to be fixed with the guide panel 156.

Further, a main board 140 may be disposed above the extended LED fixing plate 158 in a direction substantially parallel to the extended LED fixing plate 158. The main board 140 may be disposed between the extended LED fixing plate 158 and the source printed circuit board 119.

In the exemplary embodiment of the present disclosure, the display panel 110 and the backlight unit implement a unibody design by means of the bottom cover 155. In the related art, an exterior appearance is formed by two configurations of the guide panel and the bottom cover. However, in the exemplary embodiment of the present disclosure, the guide panel 156 is disposed only below the display panel 110 to be used to fix a partial configuration of the backlight, that is, the optical sheet 152. The bottom cover 155 covers all rear surfaces and side surfaces of the display panel 110 and the backlight unit to form an exterior appearance.

With this configuration, according to the present disclosure, a coloring task due to the material difference of the guide panel 156 and the bottom cover 155 is not necessary so that the process may be simplified.

In the meantime, the light that proceeds to the light incident surface of the light guide plate 151 may be emitted toward the upper portion where the display panel 110 is disposed while passing through several total reflection processes inside the light guide plate 151.

At this time, the light guide plate 151 may include a pattern with a specific shape on a rear surface to supply uniform surface light sources. The pattern may be configured with various patterns, such as an elliptical pattern, a polygonal pattern, or a hologram pattern, to guide the light incident therein and the pattern may be formed on a lower surface of the light guide plate 151 by a printing method or an injecting method.

The optical sheet 152 may be configured by a diffusion sheet for diffusing surface light emitted from the light guide plate 151, a prism sheet for condensing light, and a protective sheet which performs an auxiliary function for protecting the prism sheet and diffusing light, but is not limited thereto.

In the meantime, the bottom cover 155 of the exemplary embodiment of the present disclosure may include a lower portion 155a which encloses rear surfaces and side surfaces of the display panel 110 and the backlight unit and one or more side portion 155b which is bent to be perpendicular to the lower portion 155a. In some embodiments, each of the one or more side portions 155b is bent perpendicularly from the lower portion of the bottom cover and extends in the second direction. In some embodiments, each side portion 155b may be configured to be bent perpendicular to four edges of the lower portion 155a excluding corners, but is not limited thereto. In some embodiments, the lower portion 155a includes a plurality of edges, and each of the plurality of edges of the lower portion is connected to a corresponding side portion 155b that is bent perpendicular from the lower portion 155a.

Further, the bottom cover 155 according to the exemplary embodiment of the present disclosure may form an in-curling structure by inwardly bending four side portions 155b toward the inside of the display panel 110 by approximately 180 degrees, that is, inner side portions 155c and 155c'. In some embodiments, each inner side portion 155c or 155c' is bent inward from a corresponding side portion 155b toward the display panel and extends in the second direction such that the inner side portion is parallel to the corresponding side portion 155b. In some embodiments, a side portion 155b of the bottom cover 155 is connected to a corresponding inner side portion 155c or 155c' that is bent inward from the side portion 155b. In some embodiments, at least one of the one or more inner side portions 155c, 155c' is bent inward by 180 degrees.

In some embodiments, three of the one or more inner side portions 155c, 155c' of a left end, a right end, and an upper end of the bottom cover are bent in a direction parallel to the display panel to form an "L" shaped bending structure configured to support the display panel 110. Further, the bottom cover 155 forms a seating unit 155d, which extends from three inner side portions 155c of left, right, and upper ends and is bent from the inner side portion 155c by approximately 90 degrees to form an L-shaped bending structure.

Referring to FIGS. 6-8, the display device 100 includes a display panel 110 having a first side configured to display images and a second side opposite to the first side, a back cover 155, a front cover 135, and a main board 140. The back cover 155 includes a first portion (e.g., lower portion 155a) that extends in a first direction (e.g., a vertical direction) and overlaps with the display panel 110. The first portion has a first end (e.g., top end) and a second end (e.g., bottom end). The second end of the first portion extends past an end of the second side of the display panel 110. The front cover 135 has a front portion extending from the end of the display panel 110 in the first direction such that a cavity is formed between the first portion of the back cover 155 and a portion of the front cover that extends past the end of the display panel 110. The main board 140 is on the first portion of the back cover 155 in the cavity. The main board 140 overlaps the front cover 135, but is non-overlapping the display panel 110.

In some embodiments, the back cover 155 further includes a second portion (e.g., a side portion 155b at a top of the display device 100), a third portion (e.g., inner side portion 155c, and a fourth portion (e.g., seating unit 155d). The second portion extends in a second direction (e.g., a horizontal direction) that is different from the first direction. The second portion overlaps a side surface of the display panel that is between the first side and the second side of the display panel. The second portion has a first end and a second end. The first end of the second portion is connected to the first end of the first portion of the back cover. The third portion extends in the second direction toward the first portion of the back cover. The third portion has a first end and a second end. The first end of the third portion is connected to the second end of the second portion, and the third portion is shorter than the second portion. The fourth portion is connected to the second end of the third portion. The fourth portion extends in the first direction and is spaced apart from the first portion of the back cover. The display panel is on the fourth portion of the back cover.

In some embodiments, the back cover 155 further includes a fifth portion (e.g., a side portion 155b at a bottom side of the display device 100) and a sixth portion (e.g., inner side portion 155c'). The fifth portion extends in the second direction and is spaced apart from the second portion of the back cover. The fifth portion has a first end and a second end. The first end of the fifth portion is connected to the second end of the first portion of the back cover. The sixth portion extends in the second direction toward the first portion of the back cover. The sixth portion is connected to the second end of the fifth portion of the back cover 155.

In some embodiments, the front cover 135 further includes a bottom portion connected to an end of the front portion of the front cover 135. The bottom portion of the front cover extends in the second direction toward the first portion of the back cover 155 such that the bottom portion is connected to the sixth portion of the back cover 155.

In some embodiments, the display device 100 further includes a backlight between the display panel 110 and the first portion of the back cover 155 that overlaps the display panel 110. The backlight unit is configured to supply light to the display panel 110. In some embodiments, the backlight unit includes a light source, a light guide plate 151, a reflective plate 153, and multiple optical sheets 152. The light guide plate 151 is configured to supply surface light to the display panel 110. The light guide plate includes a top surface facing the display panel 110 and a rear surface facing the back cover 155. The reflective plate 153 is on the rear surface of the light guide plate 151. The multiple optical sheets are on the top surface of the light guide plate 153.

As described above, according to the present disclosure, a hemming structure and a bending structure are applied to three surfaces or four surfaces to reinforce the rigidity and protect the side surface of the adhesive tape 115.

The three inner side portions 155c of the bottom cover 155 which is bent in an "L-shape" may configure the seating unit 155d.

Here, the corner portions of the bottom cover 155 are cut to bend four edges and then a primary bending process is performed on four edges to form the side portion 155b. After forming the side portions 155b on four surfaces of the bottom cover 155, a secondary bending process is performed on three side portions 155b of left, right, and upper ends to form the seating unit 155d with an L-shaped bending structure. Next, a tertiary bending process is performed on four side portions 155b to form inner side portions 155c and 155c' with an in-curling (or hemming) structure.

A rear edge of the display panel 110 may be seated in the seating unit 155d.

The display panel 110 may be attached to the seating unit 155d of the bottom cover 155 by means of the adhesive tape 115.

The adhesive tape 115 may have a frame shape along left, right, and upper edges excluding a lower end of the display panel 110, but is not limited thereto.

The side portion 155b of the bottom cover 155 and the inner side portions 155c and 155c' may be in contact with each other, but are not limited thereto.

The inner side portions 155c and 155c' of the bottom cover 155 may have a smaller height than the side portion 155b. For example, the side portion 155b of the bottom cover 155 may have a height H1 of approximately 4.5 to 6 mm and three inner side portions 155c of left, right, and upper ends of the bottom cover 155 may have a height H2 of approximately 1.75 to 2.75 mm, but is not limited thereto.

The three inner side portions 155c of left, right, and upper ends and the inner side portion 155c' on the lower end may have different heights, but are not limited thereto.

Three seating units 155d on the left, right, and upper ends may extend in a direction substantially parallel to the lower portion 155a, but are not limited thereto.

In the meantime, a lower end of the bottom cover 155 according to the exemplary embodiment of the present disclosure extends toward the stand unit to form a predetermined space between the other end of the guide panel 156 and the inner side portion 155c' on the lower end of the bottom cover 155. Therefore, the source printed circuit board 119 and the main board 140 are disposed in the inner space.

Accordingly, the entire thickness of the display unit 150 is reduced to implement a slip design. Further, a rear cover is deleted and only a minimum structure for hinge fixing remains on a rear surface of the display unit 150 to implement a clean and differentiated design. That is, in the related art, a circuit component such as the source printed circuit board and the main board are disposed on a rear surface of the bottom cover to protrude to the rear side and a rear cover is necessary to protect the circuit components. In this case, the thickness of the display unit is not uniform due to the rear cover to be thick so that the elegance of the exterior design is halved. In contrast, in the present disclosure, the rear cover is deleted and the circuit components, such as the source printed circuit board 119 and the main board 140 are disposed in an inner space of the bottom cover 155. Therefore, it is understood that the thickness of the display unit 150 is uniform to be approximately 4.5 to 6 mm and the thickness of the lower end is reduced by approximately 90% as compared with the related art. Further, a design with a flat rear surface of the display unit 150 may be implemented. That is, a clean and differentiated design in which any shape or any structure is not formed on the rear surface of the display unit 150 may be implemented.

The main board 140 disposed in the bottom cover 155 may be connected to the LED fixing plate 158 by means of a first cable (not illustrated) and the main board 140 and the source printed circuit board 119 may be connected to each other by means of a second cable (not illustrated).

The first cable and the second cable may be embedded in the inner space of the bottom cover 155.

Further, a top surface and a side surface of the main board 140 which is seated in the inner space of the bottom cover 155 may be covered by the front cover 135 and the source printed circuit board 119 seated above the main board 140 and a part of lower ends of the display panel 110 may be covered by the front cover 135.

In the meantime, according to the present disclosure, the source printed circuit board is disposed inside the bottom cover and the main board is covered with the rear cover. Accordingly, even though the rear cover is applied, the protrusion to the rear surface may be minimized (or at least reduced) to minimize (or reduce) the thickness of the display device, which will be described in detail with reference to FIGS. 9 to 15.

Figure 9:
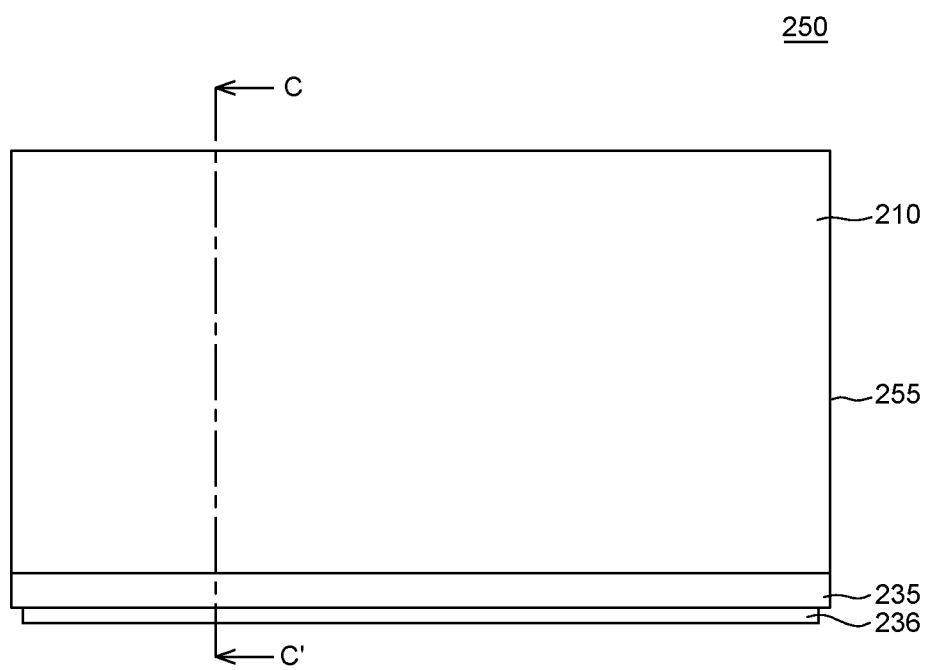
FIG. 9 is a front view of a display unit according to another exemplary embodiment of the present disclosure.

FIG. 9 is a front view of a display unit according to another exemplary embodiment of the present disclosure.

Figure 10:
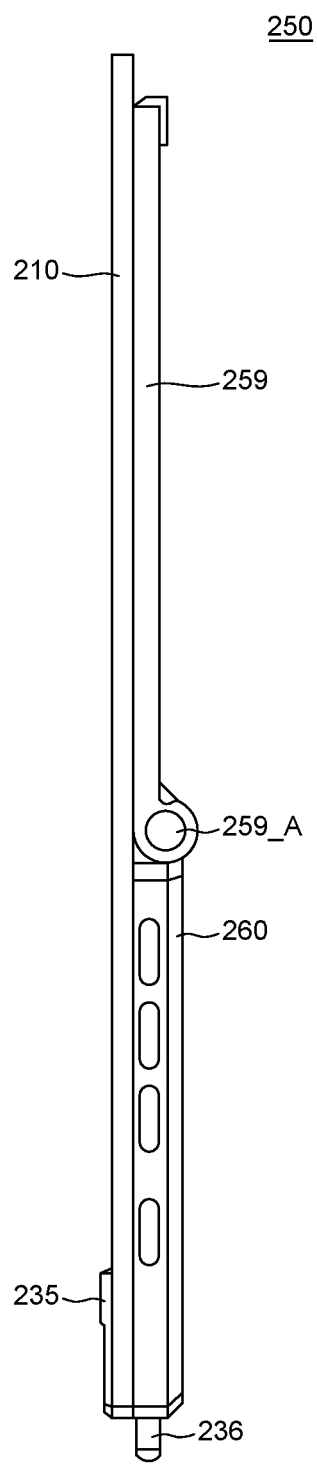
FIG. 10 is a side view of a display unit according to another exemplary embodiment of the present disclosure.

FIG. 10 is a side view of a display unit according to another exemplary embodiment of the present disclosure.

Figure 11:
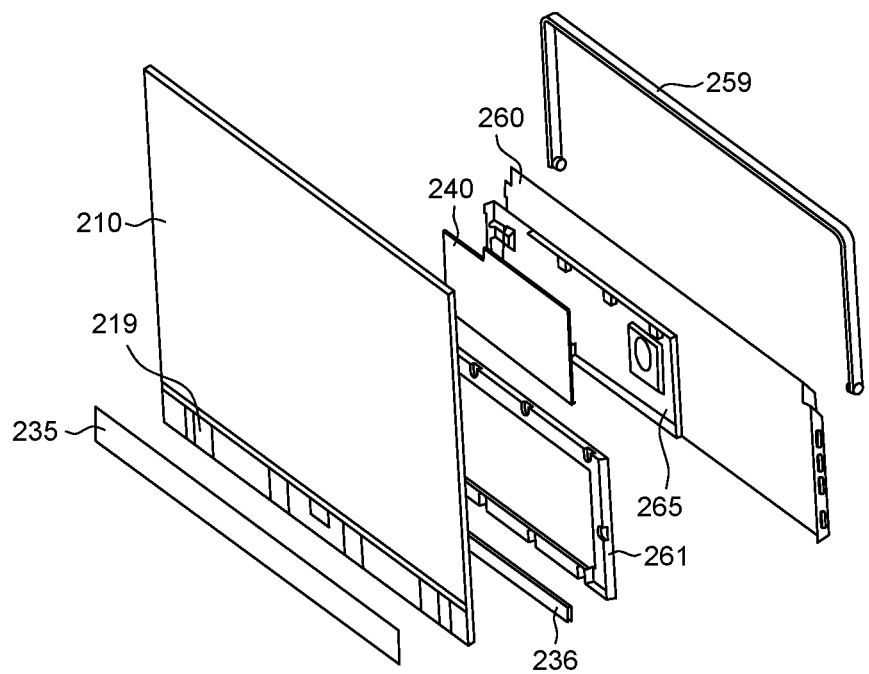
FIG. 11 is an exploded perspective view of a display unit according to another exemplary embodiment of the present disclosure.

FIG. 11 is an exploded perspective view of a display unit according to another exemplary embodiment of the present disclosure.

Figure 12:
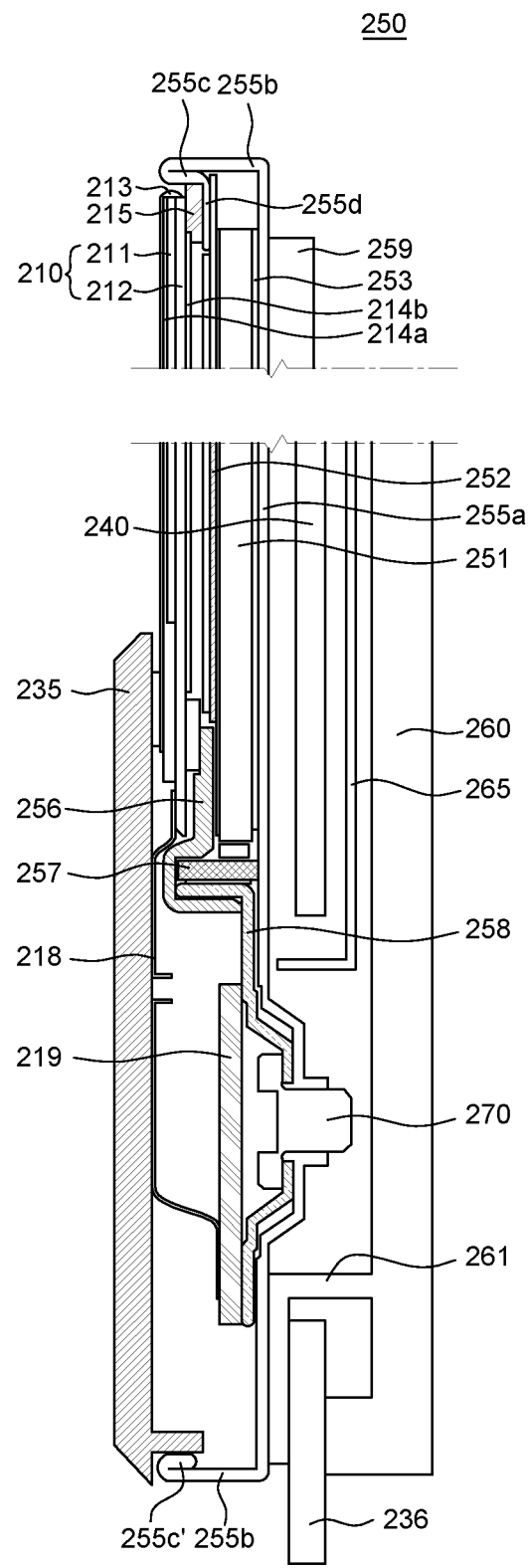
FIG. 12 is a cross-sectional view taken along the line C-C' of FIG. 9 according to an exemplary embodiment of the present disclosure.

FIG. 12 is a cross-sectional view taken along the line C-C' of FIG. 9.

Another exemplary embodiment of the present disclosure of FIGS. 9 to 12 is formed with the substantially same configuration as the above-described exemplary embodiment of the present disclosure of FIGS. 3 to 8 except that a source printed circuit board 219 is disposed inside a bottom cover 255 and a main board 240 is covered with a rear cover 260.

FIG. 10 illustrates a side view of the display unit 250 of FIG. 9 seen from the right side and it is understood that the source printed circuit board 219 is disposed inside the bottom cover 255 and the main board 240 is covered with the rear cover 260 so that the thickness is reduced as compared with a comparative embodiment.

First, referring to FIGS. 9 to 12, a display unit 250 according to another exemplary embodiment of the present disclosure may include a display panel 210, a bottom cover 255, a main board 240, and a rear cover 260. The display panel 210 displays an image, the bottom cover 255 encloses a rear surface and a side surface of the display panel 210, the main board 240 is disposed on a rear surface of the bottom cover 255, and the rear cover 260 encloses the main board 240 and various components.

As described above, the display panel 210 may be configured by upper and lower substrates 211 and 212 and a liquid crystal layer (not illustrated) interposed between the upper and lower substrates 211 and 212.

Hereinafter, it is assumed that the display panel 210 is a liquid crystal display panel, but as described above, the present disclosure is not limited thereto.

Upper and lower polarizers 214a and 214b which selectively transmit only specific light may be attached onto outer surfaces of the upper and lower substrates 211 and 212, respectively.

A sealing unit 213, such as sealant, may be provided on edge side surfaces of the upper and lower substrates 211 and 212 excluding the lower side to seal the side surfaces of the upper and lower substrates 211 and 212.

The display unit 250 may further include a flexible film 218 and a source printed circuit board 219.

The flexible film 218 is a film in which various components are disposed on a base film having a ductility and may be electrically connected to the display panel 210.

For example, the flexible film 218 is disposed on the entire lower side of the display panel 210 to supply a power voltage, a data voltage, and the like to a plurality of sub pixels and circuits.

Further, the source printed circuit board 219 is disposed on a rear surface of the flexible film 218 to be connected to the flexible film 218.

According to another exemplary embodiment of the present disclosure, the source printed circuit board 219 is disposed on a lower end of the display panel 210 in a substantially parallel direction to the display panel 210. That is, the source printed circuit board 219 may be disposed on the lower end of the display panel 210 to be flat in a substantially parallel direction to the display panel 210.

At this time, the front cover 235 is disposed on a part of the lower end of the display panel 210 and the entire surface of the source printed circuit board 219 to cover and protect the flexible film 218 and the source printed circuit board 219.

In the meantime, on a rear surface of the display panel 210 configured as described above, a backlight unit which supplies light and a bottom cover 255 which accommodates the backlight unit and the display panel 210 may be disposed.

The backlight unit may include an LED array assembly 257 including a light source accommodated in the bottom cover 255, a light guide plate 251 which supplies a surface light source to the display panel 210 through the light source, a reflective plate 253 which is disposed on a rear surface of the light guide plate 251, and a plurality of optical sheets 252. The plurality of optical sheets 252 is disposed on a top surface of the light guide plate 251. However, the backlight unit is not limited thereto.

For example, an LED fixing plate 258 which mounts the LED package may be disposed on a rear surface of the LED array assembly 257. The LED fixing plate 258 may be also referred to as an LED housing.

The LED fixing plate 258 may extend to the outside. That is, the LED fixing plate 258 may extend to a lower direction of the bottom cover 255 in a direction substantially parallel to a lower portion 255a of the bottom cover 255. At this time, the LED fixing plate 258 which extends to a lower direction of the bottom cover 255 may be disposed in the bottom cover 255.

For example, the LED fixing plate 258 disposed in the bottom cover 255 may be fastened therewith by means of a fastening unit 270 such as a screw. However, the present disclosure is not limited to the above-described fixing method, but the LED fixing plate 258 may be attached onto the bottom cover 255 by means of a double-sided tape.

The source printed circuit board 219 may be disposed on a top surface of the LED fixing plate 258, but is not limited thereto.

For example, a partial configuration of the backlight may be fixed by the guide panel 256 and the guide panel 256 may be fixed by the LED fixing plate 258. As described above, the guide panel 256 is disposed at a lower side of the display panel 210 and one end thereof extends between the display panel 210 and the optical sheet 252 to fix a lower end of the optical sheet 252 and the other end is downwardly bent while forming an accommodation space therein. Therefore, the LED array assembly 257 and the LED fixing plate 258 may be interposed in the accommodation space. The guide panel 256 may be fixed by the LED fixing plate 258 through a fixing unit 245, such as a hook. That is, the fixing unit 245 such as a hook is disposed in the LED fixing plate 258 to be fixed with the guide panel 256. The fastening between the guide panel 256 and the LED fixing plate 258 will be described below with reference to FIGS. 13 to 15.

In the meantime, according to another exemplary embodiment of the present disclosure, the main board 240 may be disposed on the rear surface of the bottom cover 255 in a direction substantially parallel to a lower portion 255a of the bottom cover 255. For example, the main board 240 may be disposed between the bottom cover 255 and the rear cover 260.

Further, a metal frame 265 may be disposed between the main board 240 and the rear cover 260. For example, the metal frame 265 may enclose the main board 240 and suppress the short circuit and protect the main board 240 from the external force.

The bottom cover 255 of another exemplary embodiment of the present disclosure may include a lower portion 255a which encloses rear surfaces and side surfaces of the display panel 210 and the backlight unit and a side portion 255b which is bent to be perpendicular to the lower portion 255a. For example, the side portion 255b may be configured to be bent perpendicular to four edges of the lower portion 255a excluding corners, but is not limited thereto.

Further, the bottom cover 255 according to the exemplary embodiment of the present disclosure may form an in-curling structure by inwardly bending four side portions 255b toward the inside of the display panel 210 by approximately 180 degrees, that is, inner side portions 255c and 255c'. Further, for example, the bottom cover 255 may form a seating unit 255d which extends from three inner side portions 255c of left, right, and upper ends and is bent from the inner side portion 255c at approximately 90 degrees to form an L-shaped bending structure.

As described above, according to the present disclosure, a hemming structure and a bending structure are applied to three surfaces or four surfaces to reinforce the rigidity and protect the side surface of the adhesive tape 215.

The three inner side portions 255c of the bottom cover 255 which are bent in an "L-shape" may configure the seating unit 255d.

A rear side edge of the display panel 210 may be seated in the seating unit 255d.

The display panel 210 may be attached to the seating unit 255d of the bottom cover 255 by means of the adhesive tape 215.

The adhesive tape 215 may have a frame shape along left, right, and upper edges excluding a lower edge of the display panel 210, but is not limited thereto.

The side portion 255b and the inner side portions 255c and 255c' of the bottom cover 255 may be in contact with each other, but are not limited thereto.

The inner side portions 255c and 255c' of the bottom cover 255 may have a smaller height than the side portion 255b.

The three inner side portions 255c of left, right, and upper ends and the inner side portion 255c' on the lower end may have different heights, but are not limited thereto.

Three seating units 255d of the left, right, and upper ends may extend in a direction substantially parallel to the lower portion 255a, but are not limited thereto.

The lower end of the bottom cover 255 according to another exemplary embodiment of the present disclosure extends toward the stand unit to form a predetermined space between the other end of the guide panel 256 and the inner side portion 255c' on the lower end of the bottom cover 255. The flexible film 118, the source printed circuit board 219, the extended LED fixing plate 158, and the like are disposed in the inner space.

Further, the main board 240 and the metal frame 265 are disposed in a rear surface space of the bottom cover 255 which is opposite to a thickness portion of the fastening unit 270, that is, a side surface of the fastening unit 270. At this time, the fastening unit 270 is provided to fasten the bottom cover 255 and the LED fixing plate 258 disposed in the bottom cover 255. Accordingly, the protrusion to the rear surface may be minimized (or at least reduced) to minimize (or at least reduce) the thickness of the display device. For example, according to another exemplary embodiment of the present disclosure, a thickness of the lower side of the display unit 250 may be reduced by approximately 56% compared to the related art. Further, according to the above-described exemplary embodiment of the present disclosure, the thickness of the lower side of the display unit 150 may be reduced by approximately 77% compared to the related art.

The main board 240 disposed on the rear surface of the bottom cover 255 may be connected to the LED fixing plate 258 by means of a first cable (not illustrated) and the main board 240 and the source printed circuit board 219 may be connected to each other by means of a second cable (not illustrated).

The first cable and the second cable may be embedded in the inner space of the rear cover 260.

In the meantime, a middle frame 261 may be disposed between the bottom cover 255 and the rear cover 260. For example, the middle frame 261 is a structure to fix the rear cover 260 to the bottom cover 255 and may be fixed to the bottom cover 255 using a fastening unit such as a screw and the rear cover 260 may be fixed to the middle frame 261.

Further, the rear cover 260 of another exemplary embodiment of the present disclosure is disposed on a lower portion of the display unit 250 and a handle 259 may be disposed on an upper portion of the display unit 250 which is opposite to the rear cover 260. The handle 259 may be used to hang the display device on the wall or stand the display device on the floor. For example, the handle 259 is rotatably fastened with the upper end of the rear cover 260 by means of a rotary shaft 259_A and is used to hang the display device on the wall. When the display device is placed on the floor, the handle is rotated to the rear surface of the rear cover 260 to support the display device.

At this time, an acrylic bar 236 may be disposed between the middle frame 261 and the rear cover 260 to protrude toward the lower side of display unit 250, but is not limited thereto.

When the display device is placed on the floor, the acrylic bar 236 may support the display device together with the handle 259.

Figure 13:
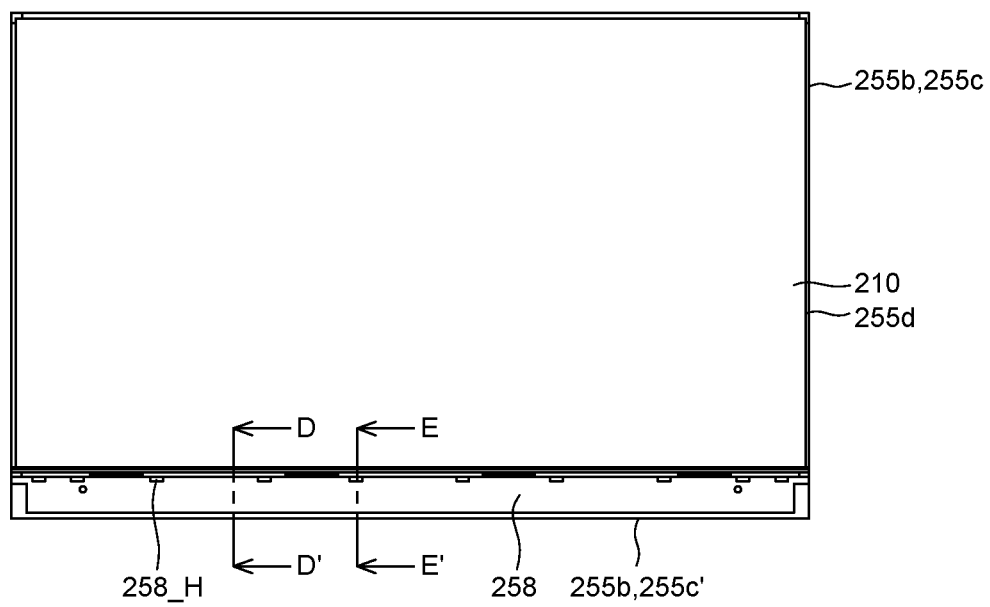
FIG. 13 is another front view of a display unit according to another exemplary embodiment of the present disclosure according to an exemplary embodiment of the present disclosure.

FIG. 13 is another front view of a display unit according to another exemplary embodiment of the present disclosure.

Figure 14A:
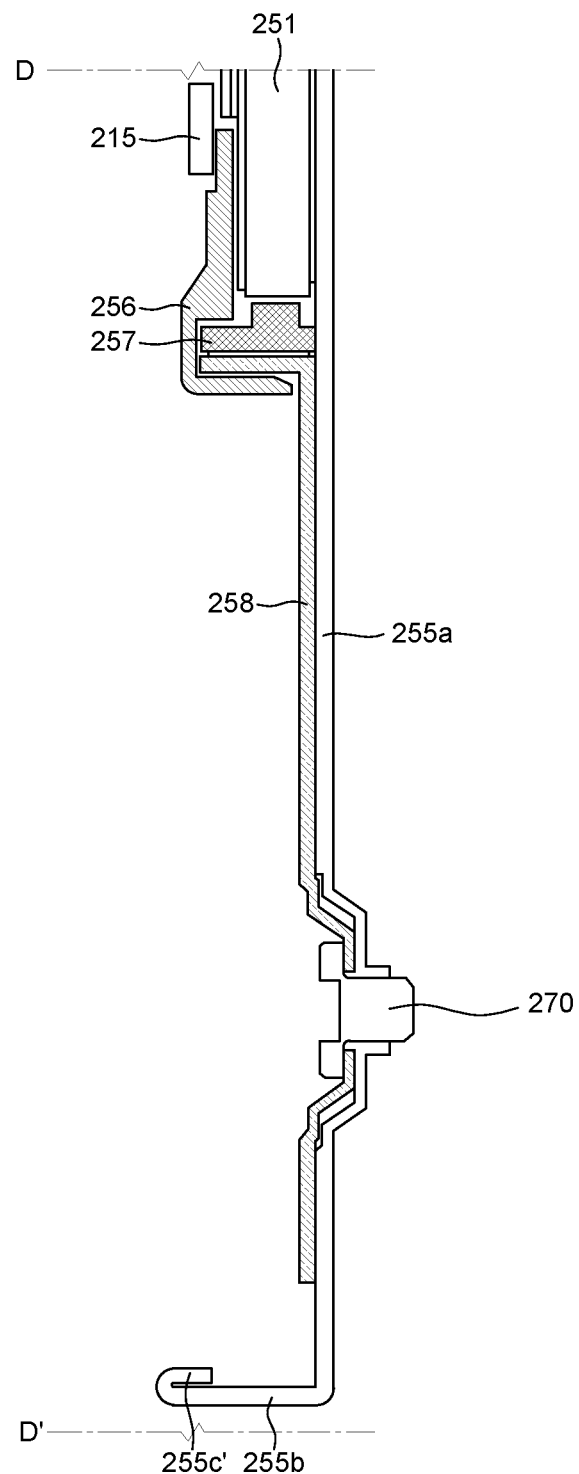
FIG. 14A is a cross-sectional view taken along the line D-D' of FIG. 13 according to an exemplary embodiment of the present disclosure.

FIG. 14A is a cross-sectional view taken along the line D-D' of FIG. 13 according to an exemplary embodiment of the present disclosure.

Figure 14B:
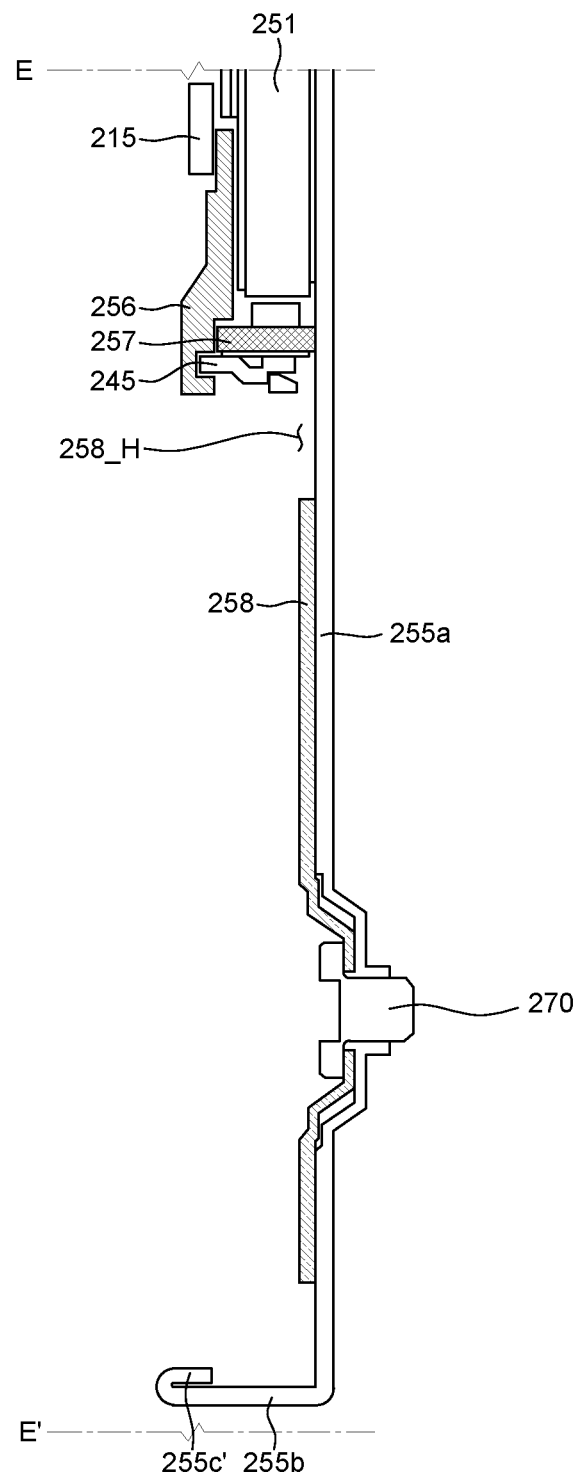
FIG. 14B is a cross-sectional view taken along the line E-E' of FIG. 13 according to an exemplary embodiment of the present disclosure.

FIG. 14B is a cross-sectional view taken along the line E-E' of FIG. 13 according to an exemplary embodiment of the present disclosure.

Figure 15:
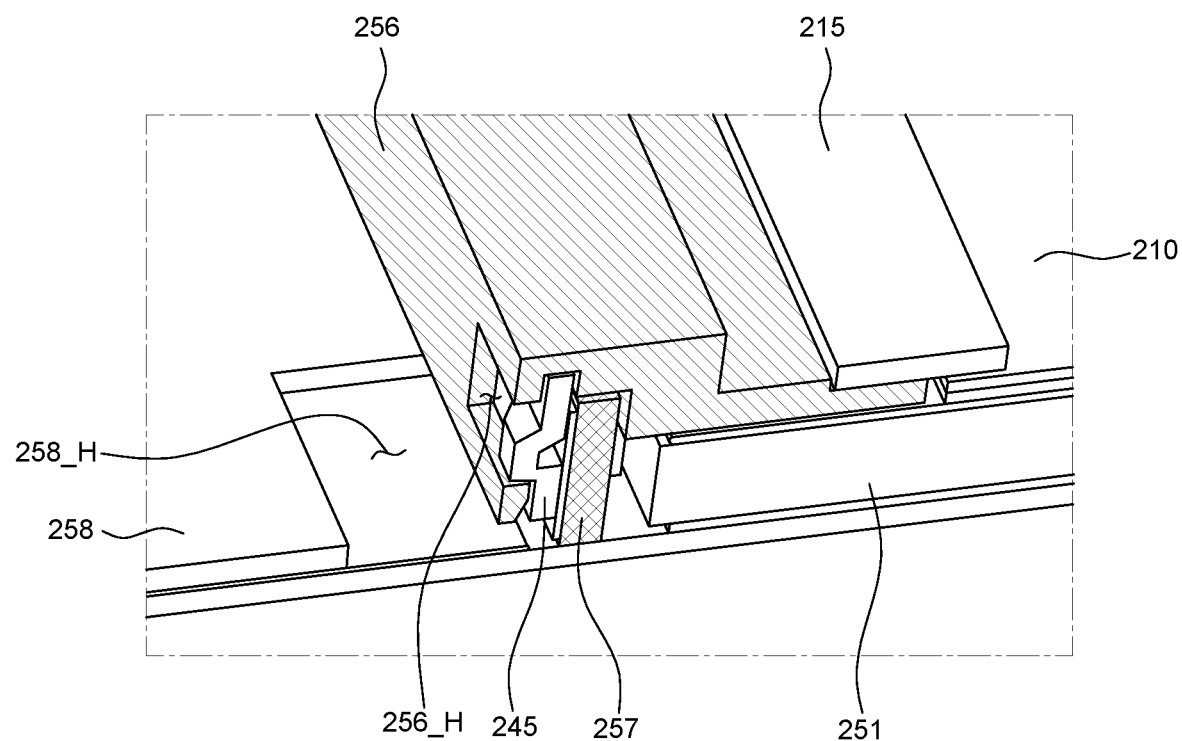
FIG. 15 is a detailed perspective view of a part of a cross-section taken along the line E-E' of FIG. 13 according to an exemplary embodiment of the present disclosure.

FIG. 15 is a detailed perspective view illustrating a part of a cross-section taken along the line E-E' of FIG. 13 according to an exemplary embodiment of the present disclosure.

FIGS. 13 to 15 illustrate the fastening of the guide panel 256 and the LED fixing plate 258 as an example, which may be applied to the display device according to the above-described exemplary embodiment of the present disclosure in the same way.

FIG. 14A illustrates a cross-section of a lower end of the display unit 250 which does not pass through a hole 258_H and FIG. 14B illustrates a cross-section of a lower end of the display unit 250 which passes through the hole 258_H.

Further, FIG. 15 is a detailed perspective view of a part of a cross-section of the lower end of the display unit 250 which passes through the hole 258_H.

Referring to FIGS. 13 to 15, in the present disclosure, the LED fixing plate 258 may serve to fix the LED array assembly 257 and guide the source printed circuit board 219 or the main board 240.

Further, the guide panel 256 may serve to suppress leakage of light emitted from the LED array assembly 257 and fix the display panel 210 by means of the adhesive tape 215.

For example, a partial configuration of the backlight may be fixed by the guide panel 256 and the guide panel 256 may be fixed by the LED fixing plate 258. As described above, the guide panel 256 is disposed at a lower side of the display panel 210 and one end thereof extends between the display panel 210 and the optical sheet 252 to fix a lower end of the optical sheet 252 and the other end is downwardly bent while forming an accommodation space therein. Therefore, the LED array assembly 257 and the LED fixing plate 258 may be interposed in the accommodation space.

The LED array assembly 257 may be disposed to be opposite to the light guide plate 251 and the LED fixing plate 258 may be disposed on the rear surface of the LED array assembly 257.

The LED fixing plate 258 may extend to the outside. That is, the LED fixing plate 258 may extend to a lower direction of the bottom cover 255 in a direction substantially parallel to a lower portion 255a of the bottom cover 255. At this time, the LED fixing plate 258 which extends to a lower direction of the bottom cover 255 may be disposed in the bottom cover 255.

In the meantime, holes 258_H may be formed in an upper end of the LED fixing plate 258 extending to the lower direction with a regular interval. The holes 258_H may be formed to allow an operator to easily disassemble the guide panel 256.

As described above, the LED fixing plate 258 may be interposed in the accommodating space in the other end of the guide panel 256 and for example, may include a fixing unit 245 (also referred to as a hook) protruding toward the inner side portion 255c' of the lower end of the bottom cover 255. The fixing unit 245 is inserted into a hole 256_H provided in the guide panel 256 to fasten the LED fixing plate 258 with the guide panel 256.

At this time, the hook 245 and the hole 258_H of the LED fixing plate 258 may be formed to be adjacent to each other.

The exemplary embodiments of the present disclosure can also be described as follows:

According to an aspect of the present disclosure, there is provided a display device. The display device comprises a display panel which displays images and a bottom cover which encloses a rear surface and a side surface of the display panel, a lower end of the bottom cover may extend from a lower end of the display panel to dispose a source printed circuit board in an inner space.

The display panel and the bottom cover may configure a display unit, and a stand unit which may be installed on a lower end of the display unit to support the display panel and the bottom cover may be further provided.

The display device may further include a backlight unit which may be disposed on a rear surface of the display panel to supply light to the display panel, the bottom cover may enclose the rear surface and the side surface of the display panel and may accommodate the display panel and the backlight unit therein.

The bottom cover may include a lower portion, a side portion which may be bent perpendicularly from the lower portion and an inner side portion which may be inwardly bent from the side portion to be opposite to the side portion.

The side portion may be configured to be bent perpendicular to four edges of the lower portion excluding corners.

The inner side portion of the bottom cover may configure an in-curling structure by inwardly bending four side portions of the bottom cover.

The inner side portion may be configured by being inwardly bent by 180 degrees.

Three inner side portions of left, right, and upper ends of the bottom cover may be bent in a direction parallel to the display panel to configure an "L" shaped bending structure and the three inner side portions of left, right, and upper ends of the bottom cover which may be bent in the "L" shape may configure a seating unit.

The display panel may be attached to the seating unit of the bottom cover by means of an adhesive tape.

The adhesive tape may have a frame shape along left, right, and upper edges excluding the lower end of the display panel.

The side portion and the inner side portion may be in contact with each other.

The inner side portion may have a height shorter than the side portion and the inner side portions of the left, right, and upper ends and the inner side portion of the lower end may have different heights.

The seating unit may extend in a direction parallel to the lower portion.

The display device may further include a flexible film which is electrically connected to the display panel and a source printed circuit board which is disposed on one end of the flexible film to be electrically connected to the flexible film, the flexible film and the source printed circuit board may be disposed in an inner space of the bottom cover.

The source printed circuit board may be disposed to be flat on the lower end of the display panel in a direction parallel to the display panel.

The backlight unit may include a light source, a light guide plate which supplies a surface light source to the display panel through the light source, a reflective plate disposed on a rear surface of the light guide plate and a plurality of optical sheets disposed on a top surface of the light guide plate.

The display device may further include an LED fixing plate disposed on a rear surface of the light source, the LED fixing plate may extend toward a lower side of the bottom cover in a direction parallel to the lower portion.

The LED fixing plate which extending toward the lower side of the bottom cover may be disposed in an inner space of the bottom cover.

The display device may further include a guide panel which may be disposed below the display panel and may have one end extending between the display panel and the optical sheet to fix a lower end of the optical sheet and the other end forming an accommodation space therein and being downwardly bent so that the light source and the LED fixing panel may be interposed in the accommodating space to be fixed.

The main board may be disposed above the extended LED fixing plate in a direction parallel to the extended LED fixing plate and the main board may be disposed between the extended LED fixing plate and the source printed circuit board.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
    a display panel configured to display images, the display panel comprising a rear surface extending in a first direction, and a side surface extending in a second direction different from the first direction; and
    a bottom cover enclosing the rear surface and the side surface of the display panel,
    a lower end of the bottom cover extending from a lower end of the rear surface of the display panel along the first direction such that an inner space is formed in the display device; and
    a source printed circuit board in the inner space, the source printed circuit board non-overlapping with the display panel,
    wherein the bottom cover includes:
        a lower portion extending in the first direction, the lower portion including the lower end of the bottom cover;
        one or more side portions, each of which is bent from the lower portion of the bottom cover and extends in the second direction; and
        one or more inner side portions, each inner side portion bent inward from a corresponding side portion from the one or more side portions in the second direction such that the inner side portion is parallel to the corresponding side portion, and
    wherein three of the one or more inner side portions of a left end, a right end, and an upper end of the bottom cover are bent in a direction parallel to the display panel to form an "L" shaped bending structure configured to support the display panel.

2. The display device according to claim 1, further comprising:
    a stand attached to the lower end of the bottom cover.

3. The display device according to claim 1, further comprising:
    a backlight on the rear surface of the display panel, the backlight configured to supply light to the display panel,
    wherein the bottom cover encloses the rear surface and the side surface of the display panel, and the display panel and the backlight are on the bottom cover.

4. The display device according to claim 3, wherein the lower portion includes a plurality of edges, and each of the plurality of edges of the lower portion is connected to a corresponding one of the one or more side portions that is bent perpendicular from the lower portion.

5. The display device according to claim 4, wherein a side portion of the one or more of side portions of the bottom cover is connected to a corresponding inner side portion from the one or more inner side portions that is bent inward from the side portion toward the display panel.

6. The display device according to claim 3, wherein at least one of the one or more inner side portions is bent inward by 180 degrees.

7. The display device according to claim 3, wherein the display panel is attached to the "L" shaped bending structure by an adhesive tape.

8. The display device according to claim 7, wherein the adhesive tape has a frame shape along a left edge, a right edge, and an upper edge excluding the lower end of the display panel.

9. The display device according to claim 3, wherein the one or more side portions and the one or more inner side portions are in contact with each other.

10. The display device according to claim 3, wherein an inner side portion from the one or more inner side portions has a height that is less than a height of a side portion from the one or more side portions from which the inner side portion extends, and inner side portions of a left end, a right end, and an upper end have a different height from the inner side portion of the lower end.

11. The display device according to claim 3, wherein the "L" shaped bending structure extends in the first direction such that the "L" shaped bending structure is parallel to the lower portion.

12. The display device according to claim 3, further comprising:
    a flexible film that is electrically connected to the display panel,
    wherein the source printed circuit board is on one end of the flexible film and is electrically connected to the flexible film, and the flexible film is in an inner space of the bottom cover.

13. The display device according to claim 12, wherein the source printed circuit board lies flat on the lower end of the display panel in a direction parallel to the display panel.

14. The display device according to claim 12, wherein the backlight includes:
    a light source;
    a light guide plate configured to supply a surface light source to the display panel through the light source;
    a reflective plate on a rear surface of the light guide plate; and
    a plurality of optical sheets on a top surface of the light guide plate.

15. The display device according to claim 14, further comprising:

a light emitting diode (LED) fixing plate on a rear surface of the light source, the LED fixing plate extending in the first direction such that the LED fixing plate is parallel to and overlapping the lower portion.

16. The display device according to claim 15, wherein the LED fixing plate extends toward the lower side of the bottom cover in an inner space of the bottom cover.

17. The display device according to claim 16, wherein the source printed circuit board is on a top surface of the LED fixing plate.

18. The display device according to claim 16, wherein the LED fixing plate extends to a lower direction of the bottom cover in a direction parallel to a lower portion of the bottom cover, and the LED fixing plate, which extends toward a lower side of the bottom cover, is in the bottom cover.

19. The display device according to claim 15, further comprising:
a guide panel below the display panel, the guide panel comprising:
a first end extending between the display panel and at least one optical sheet of the plurality of optical sheets, the first end of the display panel attached to a lower end of the at least one optical sheet, and
a second end bending downward to form an accommodation space, the light source and the LED fixing plate disposed in the accommodation space.

20. The display device according to claim 19, wherein holes are in an upper end of the LED fixing plate extending to the lower direction of the bottom cover with a regular interval and the LED fixing plate includes a hook that is adjacent to the hole and protrudes toward an inner side portion of the lower end of the bottom cover.

21. The display device according to claim 20, wherein the hook is inserted into a hole in the guide panel, the hook fastening the LED fixing plate with the guide panel.

22. The display device according to claim 15, further comprising:
a main board in the inner space of the bottom cover,
wherein the main board is disposed above the LED fixing plate in a direction parallel to the LED fixing plate and the main board is disposed between the LED fixing plate and the source printed circuit board.

23. The display device according to claim 1, further comprising:
a main board on a rear surface of the bottom cover; and
a rear cover that encloses the main board on a rear surface of the main board, the rear cover fastened with the bottom cover.

24. The display device according to claim 23, further comprising:
a middle frame between the bottom cover and the rear cover; and
a metal frame between the main board and the rear cover.

25. A display device, comprising:
a display panel having a first side configured to display images and a second side opposite to the first side;
a back cover having a first portion that extends in a first direction and overlaps with the display panel, the first portion having a first end and a second end, the second end of the first portion extending past an end of the second side of the display panel;
a front cover having a front portion extending from the end of the display panel in the first direction such that a cavity is formed between the first portion of the back cover and a portion of the front cover that extends past the end of the display panel;
a main board on the first portion of the back cover in the cavity, the main board overlapping the front cover, but non-overlapping the display panel; and
a source printed circuit board over the main board in the cavity, the source printed circuit board non-overlapping with the display panel,
wherein the back cover further comprises:
a second portion extending in a second direction that is different from the first direction and the second portion overlapping a side surface of the display panel that is between the first side and the second side of the display panel, the second portion having a first end and a second end where the first end of the second portion is connected to the first end of the first portion of the back cover;
a third portion extending in the second direction toward the first portion of the back cover, the third portion having a first end and a second end, the first end of the third portion connected to the second end of the second portion, and the third portion being shorter than the second portion; and
a fourth portion connected to the second end of the third portion, the fourth portion extending in the first direction and spaced apart from the first portion of the back cover,
wherein the display panel is on the fourth portion of the back cover.

26. The display device of claim 25, wherein the back cover further includes:
a fifth portion extending in the second direction and spaced apart from the second portion of the back cover, the fifth portion having a first end and a second end where the first end of the fifth portion is connected to the second end of the first portion of the back cover; and
a sixth portion extending in the second direction toward the first portion of the back cover, the sixth portion connected to the second end of the fifth portion of the back cover.

27. The display device of claim 26, wherein the front cover further comprises:
a bottom portion connected to an end of the front portion of the front cover, the bottom portion of the front cover extending in the second direction toward the first portion of the back cover such that the bottom portion is connected to the sixth portion of the back cover.

28. The display device of claim 27, further comprising:
a backlight between the display panel and the first portion of the back cover that overlaps the display panel, the backlight configured to supply light to the display panel.

29. The display device of claim 28, wherein the backlight includes:
a light source;
a light guide plate configured to supply surface light to the display panel, the light guide plate comprising a top surface facing the display panel and a rear surface facing the back cover;
a reflective plate on the rear surface of the light guide plate; and
a plurality of optical sheets on the top surface of the light guide plate.

* * * * *